United States Patent
Dombek

(10) Patent No.: US 6,532,966 B1
(45) Date of Patent: Mar. 18, 2003

(54) APPARATUS FOR MAKING PERFORATIONS IN THE WRAPPERS OF ROD-SHAPED PRODUCTS

(75) Inventor: Manfred Dombek, Dassendorf (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 09/603,623

(22) Filed: Jun. 26, 2000

(30) Foreign Application Priority Data

Jul. 2, 1999 (DE) .......................................... 199 30 330

(51) Int. Cl.$^7$ .............................. A24C 1/38; A24C 5/60
(52) U.S. Cl. ..................................... 131/281; 219/121.7
(58) Field of Search ................................ 131/281, 280; 219/121.7

(56) References Cited

U.S. PATENT DOCUMENTS

| | | |
|---|---|---|
| 4,265,254 A | 5/1981 | Koch et al. |
| 4,281,670 A | 8/1981 | Heitmann et al. |
| 4,665,930 A * | 5/1987 | Arthur et al. ............... 131/281 |
| 5,135,008 A | 8/1992 | Oesterling et al. |
| 5,148,818 A | 9/1992 | Arthur |

FOREIGN PATENT DOCUMENTS

| | | |
|---|---|---|
| DE | 27 51 522 C2 | 8/1978 |
| DE | 33 10 930 C2 | 10/1983 |
| DE | 34 31 051 C2 | 3/1985 |
| DE | 34 31 067 C2 | 3/1985 |
| DE | 42 18 266 A1 | 12/1993 |
| DE | 198 56 413 | 6/2000 |
| EP | 0 659 354 A1 | 6/1995 |
| EP | 0 672 356 A1 | 9/1995 |

OTHER PUBLICATIONS

"Training A Laser Beam and Pacing Lead With A Deflectable Tip", Research Disclosure, Mar. 1997, vol. 187:39546–39547.

* cited by examiner

Primary Examiner—Christopher A. Fiorilla
(74) Attorney, Agent, or Firm—Venable; Robert Kinberg; Chad C. Anderson

(57) ABSTRACT

An apparatus for increasing the permeability of tubular wrappers of a succession of cigarettes by at least one pulsed beam of coherent radiation issuing from a laser has a hollow drum-shaped conveyor cooperating with a rolling member to define an arcuate channel wherein successive cigarettes roll while advancing sideways past a perforating station. Each beam of coherent radiation is generated in or is caused to enter the interior of the conveyor prior to being influenced by one or more deflecting and/or focussing elements to be propagated substantially radially and through an opening of the hollow conveyor and to impinge upon the wrapper of a cigarette rolling at the perforating station.

28 Claims, 3 Drawing Sheets

APPARATUS FOR MAKING PERFORATIONS IN THE WRAPPERS OF ROD-SHAPED PRODUCTS

CROSS-REFERENCE TO RELATED CASES

This application claims the priority of commonly owned German patent application Ser. No. 199 30 330.4 filed Jul. 2, 1999. The disclosure of the above-referenced German patent application, as well as that of each U.S. and foreign patent and patent application mentioned in the specification of the present application, is incorporated herein by reference.

BACKGROUND OF THE INVENTION

The invention relates to improvements in apparatus for and in methods of increasing the permeability of wrapping material for rod-shaped products, especially rod-shaped smokers' products, and more particularly to improvements in methods of and apparatus for perforating tubular envelopes or wrappers of cigarettes or the like.

It is well known to enhance the permeability of cigarette paper or other wrapping material for rod-shaped tobacco fillers and/or rod-shaped filters for tobacco smoke prior as well as subsequent to the conversion of a running web of wrapping material into a tubular envelope forming part of a continuous tobacco-containing rod; the leader of such rod is thereupon severed at regular intervals to yield a succession of discrete cigarettes, cigars, cigarillos or other rod-shaped smokers' products. It is equally known to enhance the permeability of selected portions of tubular envelopes forming part of discrete plain or filter cigarettes or analogous rod-shaped smokers' products while the products rotate about their own axes.

As a rule, a modern apparatus for enhancing the permeability of selected portions of a running web or of selected portions of tubular wrappers of successive rod-shaped smokers' products (hereinafter called cigarettes for short) comprises at least one source of high-energy radiation (such as a laser beam) and means for directing the beam or beams into one or more selected portions of the path for a running web of wrapping material or of the path for successive plain or filter cigarettes. If the apparatus is designed to perforate the finished (tubular) wrappers of plain or filter cigarettes, the cigarettes are caused to roll about their own longitudinal axes while moving sideways past the perforating station. The purpose of the perforating treatment is to ensure that the permeability of the tubular wrappers rises to a value at which an optimum quantity of atmospheric air is caused to enter the column of tobacco smoke flowing from the lighted end of a cigarette toward the mouth of the smoker. Cool atmospheric air is believed to exert a beneficial influence upon the nicotine and/or condensate contents of tobacco smoke.

U.S. Pat. No. 5,148,818 discloses a perforating apparatus which employs a source of coherent radiation (hereinafter called laser).The means for rolling successive cigarettes about their respective axes during advancement past the perforating station employs two coaxial drum-shaped conveyors and an endless flexible band. The path for the cigarettes is flanked by the band on the one hand, and by the conveyors on the other hand. The speed of the belt departs from the peripheral speeds of the conveyors, and this causes the cigarettes to roll about their respective axes. The laser is installed midway between the two rotary conveyors, and the beam of coherent radiation issuing from the laser is caused to circulate while impinging upon a tubular wrapper at a selected frequency to thus provide the wrapper with an array of perforations.

Published German patent application Serial No. 33 10 930 discloses a perforating apparatus wherein the peripheral surface of a rotary drum-shaped conveyor transports a series of cigarettes sideways past a station where the wrappers of the cigarettes are acted upon by a laser beam. The laser is confined in and is caused to move relative to a complex heart-shaped reflector. Such apparatus are complex, bulky and unreliable.

Another perforating apparatus is disclosed in published German patent application Serial No. 34 31 051 which proposes a different combination of a mobile laser and a directing system for the laser beam. The directing system employs a complex array of mirrors and rotary reflectors which are intended to focus a laser beam upon successive cigarettes while the cigarettes rotate about their respective axes and are simultaneously advanced sideways by a rotary conveyor toward, past and beyond the perforating station.

Published German patent application Serial No. 34 31 067 discloses an apparatus which combines the features of the apparatus disclosed in the aforediscussed published German patent applications Serial Nos. 33 10 930 and 34 31 051.

Published German patent application Serial No. 42 18 266 discloses a perforating apparatus wherein the cigarettes are transported and rolled by a set of drum-shaped conveyors. One of the conveyors carries a polygonal mirror which serves to direct a laser beam into the path for the cigarettes.

A further perforating apparatus is disclosed in published German patent application Serial No. 27 51 522. This publication proposes to roll successive cigarettes between the peripheral surface of a rotary drum-shaped conveyor and the complementary concave surface of a stationary rolling member. A laser beam trails successive cigarettes during sidewise movement of the cigarettes in an arcuate rolling channel between the moving peripheral surface of the drum-shaped conveyor and the stationary surface of the rolling member. The movement of the laser beam is initiated and regulated by a rotary drum-shaped member having a mirrored peripheral surface.

A drawback which is common to all of the above-enumerated perforating (permeability enhancing) apparatus is that the space requirements of such apparatus are excessive, that the apparatus are complex and hence expensive, as well as that their perforating action cannot be regulated and maintained with a desired or required degree of accuracy and facility.

Another drawback of certain conventional perforating apparatus is that, owing to their kinematics, the tubular wrapper of a cigarette can be perforated only during one-half of each revolution of a cigarette about its axis. Therefore, such apparatus are set up to expose the cigarettes to the action of laser beams which penetrate through the entire cigarette so that each beam provides two perforations which are angularly offset by 180 degrees. Such solution is not entirely satisfactory because the energy requirements of the laser are very pronounced and also because the dimensions of at least one of two simultaneously burned perforations in the tubular wrapper of the cigarette are excessive.

OBJECTS OF THE INVENTION

An object of the invention is to provide an apparatus which is simple, compact and inexpensive and occupies space that is available but is not utilized in many machines or production lines for the making of rod-shaped articles with gas-permeable tubular envelopes.

Another object of the invention is to provide an apparatus which is constructed and assembled in such a way that the beam or beams of coherent radiation need not penetrate transversely across the entire rod-shaped commodity (such as a plain or filter cigarette) at the perforating station.

A further object of the invention is to provide an apparatus which can form perforations while a rod-shaped article rotates through an angle of 360° while advancing past the perforating station.

An additional object of the invention is to provide a novel and improved method of manipulating high-energy beams of radiation in the course of enhancing the penetrability of tubular wrappers for rod-shaped tobacco fillers and/or for rod-shaped filters for tobacco smoke.

Still another object of the invention is to provide a novel laser-conveyor combination which can be put to use in the above outlined apparatus.

A further object of the invention is to provide a novel conveyor which can be utilized with a source of high-energy radiation in the apparatus of the present invention.

Another object of the invention is to provide the above outlined apparatus with novel and improved means for rolling rod-shaped articles preparatory to and during enhancement of permeability of their wrappers, such as wrappers made of cigarette paper, tipping paper or the like.

An additional object of the invention is to provide a cigarette making machine which embodies, or cooperates with, an apparatus exhibiting the above outlined novel characteristics.

Still another object of the invention is to provide an apparatus which occupies space that is normally available in a machine or production line for the making of plain and/or filter cigarettes or analogous rod-shaped commodities of the tobacco processing industry.

A further object of the invention is to provide an apparatus which can dispense with mirrored rotary bodies forming part of numerous presently employed apparatus for enhancing the permeability of tubular wrappers of rod-shaped articles being turned out by the tobacco processing industry.

An additional object of the invention is to provide an apparatus which exhibits the above outlined desirable novel characteristics and which can be designed to subject the wrappers of successive rod-shaped articles of the tobacco processing industry to the action of a single beam of high-energy radiation or to simultaneous action of plural high-energy radiation beams.

Another object of the invention is to provide rod-shaped smokers' products having tubular wrappers which were perforated in accordance with the above outlined method and/or in the above outlined apparatus.

SUMMARY OF THE INVENTION

One feature of the instant invention resides in the provision of an apparatus for increasing or enhancing the permeabilities of tubular envelopes or wrappers forming part of rod-shaped commodities and being adapted to be perforated in response to exposure to high-energy radiation. The improved apparatus comprises means for rolling a series of successive rod-shaped commodities sideways along a predetermined path. The rolling means includes an at least partially hollow conveyor having an external surface bounding a portion of the aforementioned path, and the apparatus further comprises a source of high-energy radiation and means for directing at least some of the radiation issuing from the source through the hollow conveyor and against the envelopes of commodities rolling along the aforementioned portion of the predetermined path.

The source can include at least one pulsating laser, and the commodities can include or constitute rod-shaped smokers' products (such as plain or filter cigarettes, cigars or cigarillos), The at least partially hollow conveyor can include a hollow rotary drum which is rotatable about a predetermined (e.g., horizontal) axis, and the aforementioned external surface can constitute a cylindrical surface of the hollow drum. The rolling means of such apparatus can further comprise a rolling member (e.g., a stationary rolling member) having a second surface cooperating with the peripheral surface of the hollow drum to bound a channel which defines a portion of the predetermined path.

At least a portion of the radation directing means is or can be located (installed) in the at least partially hollow conveyor. Such radiation directing means can include at least one mobile mirror, e.g., a pivotable mirror.

The improved apparatus further comprises means for supplying the series of commodities into the predetermined path, preferably in such a way that successive commodities of the series are maintained at predetermined (particularly uniform) distances from each other. The rolling means can include means (such as the means for rotating the drum-shaped conveyor) for moving the external surface at a speed which is required to ensure that any point of the envelope of a commodity rolling along the aforementioned portion of the predetermined path covers a distance greater than the circumferential length of a commodity while the supplying means advances each of the successive commodities through one of the predetermined distances. In such apparatus, the radiation directing means preferably includes at least one radiation reflecting element which is movable from a predetermined starting position while directing high-energy radiation upon the envelope of a commodity rolling in the aforementioned portion of the predetermined path (within a predetermined interval of time) back to the starting position. The speed of moving any point of an envelope of a commodity rolling along the aforementioned portion of the predetermined path is preferably such that the interval during which the aforementioned point covers that part of the aforesaid distance which exceeds the circumferential length of an envelope at least matches the predetermined interval of time to thus permit or enable the radiation reflecting element to reassume its starting position while a commodity is on its way into the aforementioned portion of the predetermined path.

The radiation directing means can comprise a mirror having a radiation reflecting surface, and such radiation directing means can further comprise means for pivoting the mirror about an axis which lies in the radiation reflecting surface of the mirror.

As already mentioned above, the at least partially hollow conveyor can comprise a hollow rotary drum-shaped conveyor which is rotatable about a predetermined (such as horizontal) axis, and the means for directing radiation can comprise a mirror which is pivotable about a second axis which (a) is at least substantially parallel to the predetermined axis, or (b) coincides with the predetermined axis. In the latter instance, the radiation directing means is or can be arranged to direct radiation upon the envelope of a commodity in the aforementioned portion of the predetermined path at a distance from the predetermined axis which is less than the radius of the external surface of the hollow drum-shaped conveyor.

The radiation directing means can comprise at least one light refracting element (e.g., a plano-convex lens). Such radiation directing means can further comprise a pivotable mirror; the at least one light refracting element can be disposed between the radiation source and the pivotable mirror, or between the pivotable mirror and the locus of impigement of high-energy radiation upon the envelope of a commodity in the aforementioned portion of the predetermined path.

As a rule, the radiation directing means of the improved apparatus will comprise at least one of (a) a collector lens, (b) a diffractive optical element, and (c) a combination of a collector lens and a diffractive optical element.

If the at least partially hollow conveyor includes or is constituted by a hollow drum which is rotatable about a predetermined (e.g., horizontal) axis and the aforementioned external surface is a cylindrical external surface of the drum, the source can be located outside of such at least partially hollow conveyor and can be set up to direct at least some of the high-energy radiation into the drum along a second path which is at least substantially parallel to the predetermined axis. The radiation directing means of such apparatus can comprise a pivotable mirror which is arranged to direct radiation upon the envelope of a commodity rolling along the aforementioned portion of the predetermined path, and means for deflecting radiation issuing from the source and for directing deflected radiation upon the pivotable mirror.

The at least partially hollow conveyor is provided with at least one opening which is disposed in the external surface of such conveyor and is partially overlapped by a commodity rolling along the aforementioned portion of the predetermined path. The radiation directing means is arranged to direct radiation upon a commodity in the aforementioned portion of the predetermined path from the interior of the at least partially hollow conveyor and through the at least one opening. The at least one opening can constitute an arcuate slot extending at least substantially circumferentially of the cylindrical surface of the hollow drum-shaped conveyor. The path for successive commodities can include or constitute an arcuate channel having its center of curvature at least close to the axis of the cylindrical external surface of the drum-shaped conveyor. The latter can be provided with a plurality of arcuate openings, and the radiation directing means can include means for splitting a beam of coherent radiation issuing from the source into a plurality of discrete beams and means for directing each discrete beam through a different opening of the conveyor.

Another feature of the invention resides in the provision of a method of perforating tubular envelopes of rod-shaped commodities by exposure to high-energy radiation. The method comprises the steps of rolling successive commodities of a series of such commodities sideways along a predetermined path which partially surrounds a hollow conveyor, establishing a source of high-energy radiation (such as a laser which emits a beam of coherent radiation), and directing from the source at least one beam of high-energy radiation in the hollow conveyor (such as into and/or within the hollow conveyor) and thence against the envelopes of successive commodities of the series rolling sideways along the predetermined path.

The establishing step can include locating the source or sources of high-energy radiation outside of the hollow conveyor.

The commodities can constitute rod-shaped smokers' products (such as plain or filter cigarettes, cigars or cigarillos) each of which has a rod-like filler (e.g., of natural, reconstituted and/or artificial tobacco and/or filter material for tobacco smoke) confined in the respective envelope (e.g., an envelope consisting of or comprising cigarette paper, tipping paper and/or other wrapping material customarily employed in the tobacco processing industry).

The establishing step of the improved method can comprise providing or employing a laser, and the radiation directing step of such method can comprise splitting the at least one beam into a plurality of (e.g., into two) discrete laser beams and directing the discrete laser beams upon different portions of envelopes of successive commodities of the series while the commodities roll sideways along the predetermined path.

The novel features which are considered as characteristic of the invention are set forth in particular in the appended claims. The improved perforating apparatus itself however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
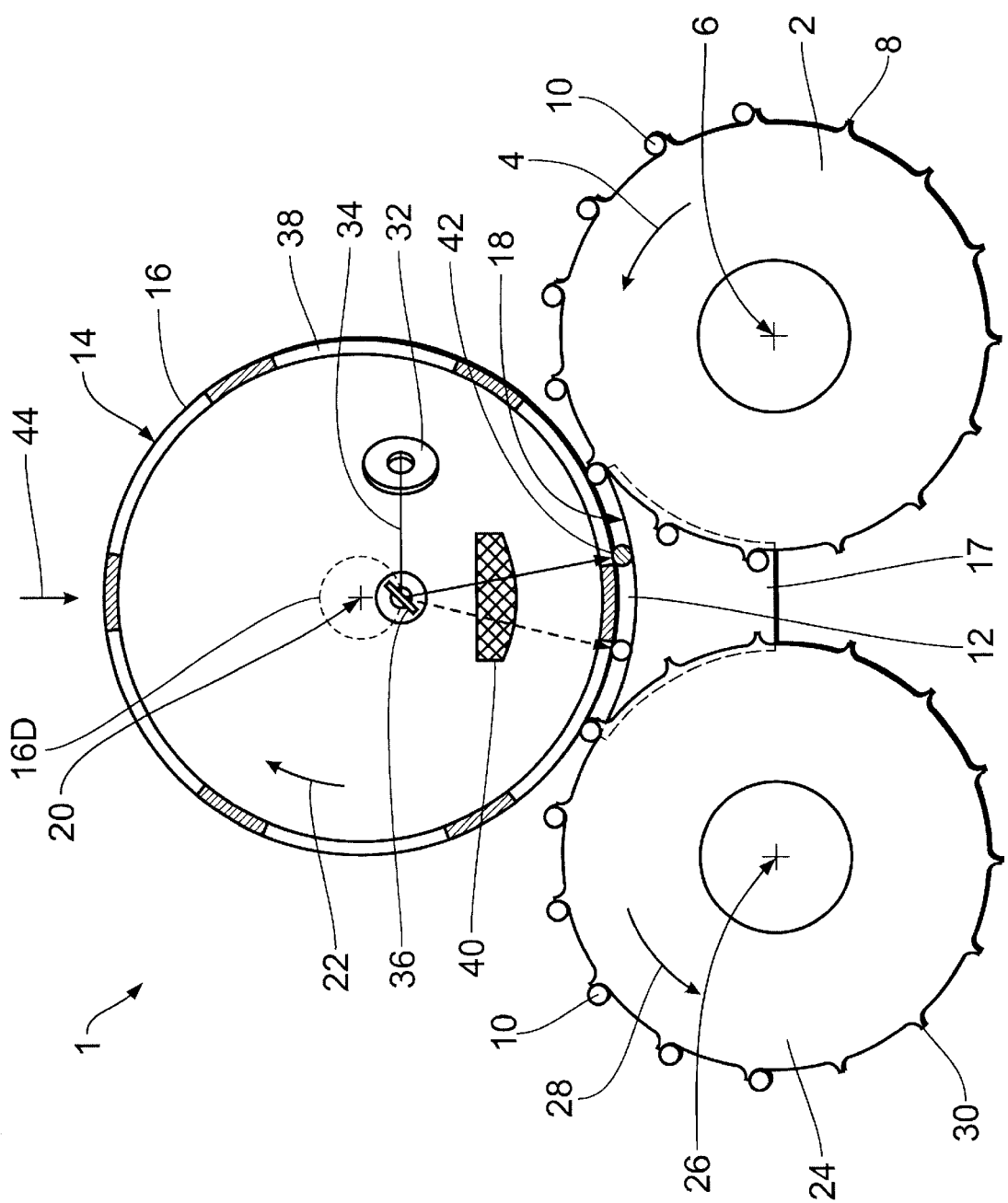
FIG. 1 is a schematic front elevational view of an apparatus which embodies one form of the invention and is designed to form perforations in selected portions of tubular envelopes of successive rod-shaped smokers' products while the products roll sideways through an arcuate channel between a hollow drum-shaped or cage-like rotary conveyor and a stationary rolling member, with the radiation source omitted.

The apparatus 1 of FIG. 1 can be installed in a cigarette maker or in another machine or production line for the making of elongated rod-shaped commodities 10 constituting smokers' products of the type wherein one or more tubular envelopes surround a rod-like filler of filter material for tobacco smoke and/or of comminuted natural, reconstituted and/or artificial tobacco. It is assumed that the commodities 10 are filter cigarettes of double unit length wherein a filter mouthpiece of double unit length is coaxial with and is located between and abuts the adjacent ends of two plain cigarettes of unit length. Each plain cigarette contains a rod-like tobacco filler and a tubular envelope or wrapper of cigarette paper, and each filter mouthpiece contains a rod-like filler of filter material (e.g., acetate fibers) for tobacco smoke and a tubular envelope of cigarette paper or the like. Furthermore, each commodity 10 comprises an adhesive-coated uniting band which can be made of artificial cork or another suitable tipping paper and is convoluted around the entire filter mouthpiece of double unit length as well as about the adjacent inner end portions of the respective plain cigarettes of unit length.

A machine which turns out filter cigarettes of double unit length is disclosed, for example, in commonly owned U.S. Pat. No. 5,135,008 granted Aug. 4, 1992 to Oesterling et al. for "METHOD OF AND APPARATUS FOR MAKING FILTER CIGARETTES", and in commonly owned U.S. Pat. No. 4,265,254 granted May 5, 1981 to Koch et al. for "APPARATUS FOR PERFORATING CIGARETTE PAPER OR THE LIKE". A machine for making plain cigarettes is disclosed, for example, in U.S. Pat. No. 4,281,670 granted Aug. 4, 1981 to Heitmann et al. for "APPARATUS FOR INCREASING THE PERMEABILITY OF WRAPPING MATERIAL FOR ROD-SHAPED SMOKERS' PRODUCTS".

The apparatus 1 of FIG. 1 comprises an at least partially hollow drum-shaped conveyor 16 which forms part of a means for rolling successive commodities 10 (hereinafter called cigarettes for short) sideways along an arcuate path one side of which is bounded by a portion of the cylindrical peripheral (external) surface 14 of the conveyor 16. Such portion of the moving peripheral surface 14 and a concave surface 18 of a stationary rolling member 17 define an arcuate channel 12 having a width which at most matches the diameter of a cigarette 10 but is preferably slightly less to thus ensure that successive cigarettes of a series of equidistant cigarettes are caused to roll about their respective axes and to simultaneously move sideways in the direction indicated by arrows 22 while advancing through that portion of their path which extends through the channel 12.

The inlet of the channel 12 receives successive cigarettes 10 of the aforementioned series from a supplying means 2 here shown as a drum-shaped conveyor which is driven to rotate in a counterclockwise direction (arrow 4). The peripheral surface of the supplying conveyor 2 is provided with equidistant axially parallel ribs 8, and the front (leading) sides of the ribs 8 are provided with suction ports (not specifically shown in FIG. 1) which attract cigarettes 10 during transport of cigarettes from a source (such as a conveyor whereon pairs of plain cigarettes of unit length are connected with filter mouthpieces of double unit length by adhesive-coated uniting bands, e.g., in a manner as described in the aforementioned U.S. '008 patent to Oesterling et al.) to the inlet of the channel 12. The axis 6 of the supplying conveyor 2 is but need not always be parallel to the axis 20 of the hollow conveyor 16. The aforementioned suction ports at the front sides of the ribs 8 are disconnected from a suction generating device (not shown) not later than at the inlet of the channel 12 to thus ensure predictable entry of successive cigarettes 10 into the channel 12 wherein the cigarettes roll about their respective longitudinal axes and simultaneously advance sideways in the direction of arrows 22 at a speed determined by the means (such as a driven shaft 16D) which serves to rotate the drum-shaped conveyor 16 about the axis 20.

The stationary rolling member 17 can be replaced with a mobile rolling member which defines the rolling surface 18 (e.g., by a portion of a driven belt), as long as the difference between the speeds of the surfaces 14, 18 is such that successive cigarettes 10 of the series supplied by the conveyor 2 (or any other suitable cigarette supplying means) suffices to ensure that each cigarette advancing in the channel 12 completes a predetermined number of revolutions about its own axis while simultaneously covering a predetermined distance in the direction indicated by the arrows 22. Such combined rolling and sidewise movement is necessary to ensure a highly predictable change (increase) of permeability of the tubular envelope during advancement of a cigarette 10 in a predetermined portion of its path in the channel 12, namely while the envelope is being perforated by coherent high-energy radiation 34 supplied by a suitable source L, e.g., a laser shown schematically in FIG. 2. The just discussed difference between the (zero) speed of the concave rolling surface 18 and the speed of the convex rolling surface 14 is selected in such a way that any given point at the external surface of the envelope of a cigarette 10 rolling in the channel 12 covers a distance exceeding the circumference of a cigarette while a cigarette on the supplying conveyor 2 covers a distance matching that between two neighboring ribs 8.

A cigarette 10 which leaves the channel 12 is attracted by suction ports (not shown) at the front side of the oncoming axially parallel peripheral rib 30 provided on a rotary drum-shaped take-off conveyor 24. The latter is rotatable counterclockwise (see the arrow 28) about an axis 26 which is parallel to the axes 6 and 20. It will be noted that the conveyors 2 and 24 rotate counterclockwise whereas the conveyor 16 rotates clockwise. The conveyor 24 delivers successive (freshly perforated) cigarettes 10 into the range of a severing tool which divides each such rod-shaped article into two filter cigarettes of unit length. Reference should be had again to the aforementioned U.S. '008 patent to Oesterling et al.

Figure 2:
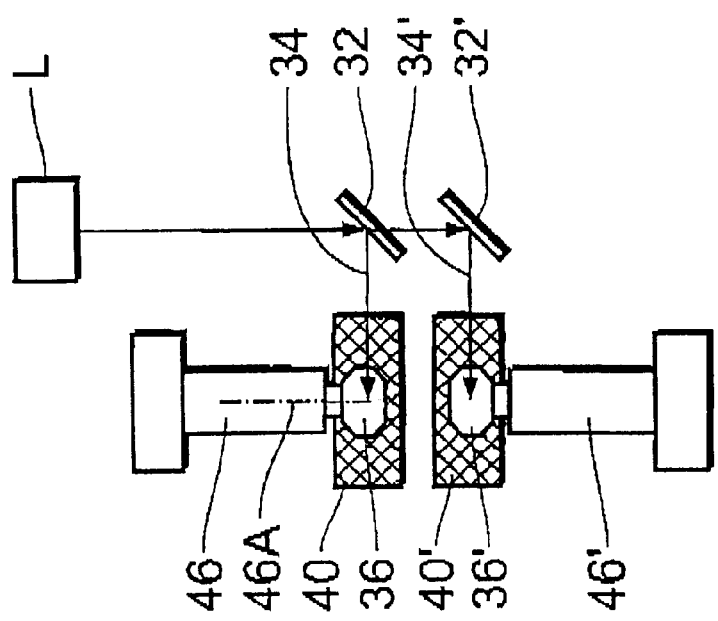
FIG. 2 is a fragmentary schematic plan view of a radiation source and of a portion of the apparatus shown in FIG. 1, certain constituents of the illustrated structure being at least partially confined in the hollow conveyor.

Referring to FIG. 2, the laser L is or can be located outside of or in the interior of the hollow drum-shaped conveyor 16. The view of FIG. 2 is taken in the direction of arrow 44 shown in FIG. 1 but with the conveyor 16 omitted. The pulsating beam of high-energy radiation issuing from the laser L is split and deflected by a mirror 32 forming part of means for directing radiation upon the envelopes of successive cigarettes 10 rolling and advancing sideways in a predetermined portion of the channel 12. The beam 34 which is deflected by the mirror 32 impinges upon a pivotable mirror 36. If the laser L is located outside of the hollow conveyor 16, the beam issuing from the laser enters the interior of the conveyor 16, preferably by advancing in paralelism with the axis 20, to impinge upon the mirror 32 which, in turn, directs the beam 34 against the pivotable mirror 36, namely at a 90° angle to the axis 20. The mirror 36 deflects the oncoming beam 34 toward the internal surface of the hollow conveyor 16, and more specifically into one of a plurality of arcuate slit- or slot-shaped openings 38 provided in the cylindrical body of the drum-shaped conveyor 16. A cigarette 10, the envelope of which is being perforated, rolls relative to the surface 14 along an opening 38 so that the rolling cigarette is in contact with the surface 14 practically all the way from end to end save for the narrow gap caused by the provision of the opening 38 which is necessary in order to enable the pulsating beam 34 of high-energy radiation to impinge upon and to perforate predetermined portions of the envelope.

As already mentioned above, a cigarette 10 which advances in the direction of arrows 22 while rolling about its own axis on the way from the inlet to the outlet of the channel 12 completes more than one full revolution, i.e., more than is necessary to provide its envelope with a circumferentially complete array of perforations. This renders it possible to pivot the mirror 36 back to a starting angular position in which the mirror is ready to direct the beam 34 upon the envelope of the next-following cigarette 10 which has entered the channel 12. This novel feature renders it possible that the permeability of the envelopes of each of a short or long series of successive cigarettes 10 supplied by the conveyor 2 is increased to the same extent.

FIGS. 1 and 2 further show a plano-convex lens 40 which is installed in the path of the beam 34 from the pivotable mirror 36 to one of the slot-shaped openings 38 in the hollow conveyor 16. The purpose of the lens 40 is to focus the beam 34 in such a way that the focal point of the laser beam 34 is located exactly at the locus 42 of impingement of the beam 34 upon the envelope of the cigarette 10 in the rolling channel 12.

The pivotable mirror 36 causes the beam 34 to follow a rolling cigarette 10 on its way from the inlet toward the outlet of the channel 12. This ensures that the envelope of such cigarette is provided with a circumferentially complete array of perforations formed by the pulsating beam 34. The exact loci of perforations are determined by the axial position of a cigarette 10 rolling in the channel 12 relative to that arcuate slot 38 which permits the beam 34 to propagate itself from the pivoting mirror 36, through the focussing lens 40, and into the rolling channel 12.

FIG. 2 shows a driving unit 46 which serves as a means for pivoting the mirror 36 relative to the mirror 32 and lens 40 about an axis 46A in order to direct the beam 34 upon the envelope of the cigarette 10 in the rolling channel 12. FIG. 2 further shows that the mirror 32 is partly reflecting so that a portion (34') of the beam issuing from the laser L can penetrate through the mirror 32 to impinge upon the fully reflecting mirror 32'. The latter deflects the beam 34' upon a second pivotable mirror 36' which, in turn, directs the beam 34' against a second plano-convex focussing lens 40' serving to direct this beam upon a selected (second) portion of the envelope of a cigarette 10 rolling in the channel 12. Thus, the apparatus 1 including the structure of FIGS. 1 and 2 can simultaneously provide a tubular envelope with two axially spaced-apart arrays of perforations, e.g., one array for each of the two ultimate products (filter cigarettes of unit length). The mirror 36' is pivotable by a second driving unit 46' which is, or which can be, identical with the driving unit 46 for the mirror 36. Driving units (46, 46') which can be utilized to pivot mirrors serving to reflect discrete laser beams are well known in the relevant arts.

The arrangement can be such that the deflecting mirror 32 directs 50% of radiation issuing from the laser L toward the pivotable mirror 36 and permits the remaining 50% of radiation (namely the beam 34') to impinge upon and to be fully reflected by the mirror 32'.

Figure 4:
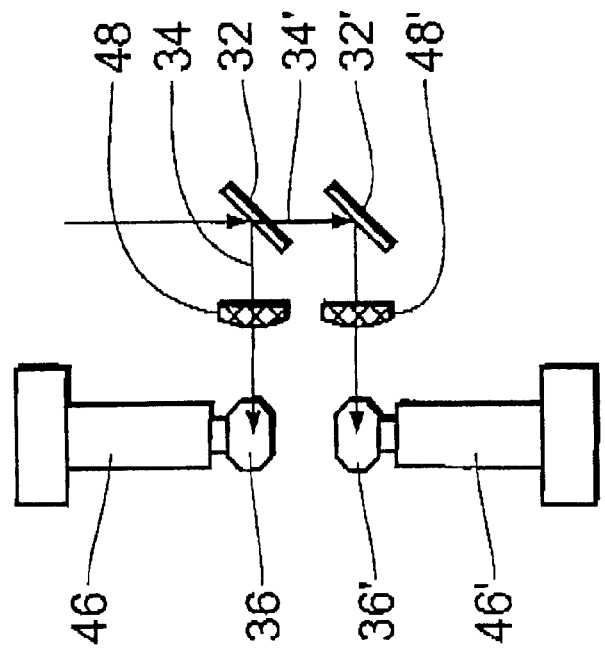
FIG. 4 is a view similar to that of FIG. 2 but showing certain parts of the apparatus embodying the structure of FIG. 3.
Figure 3:
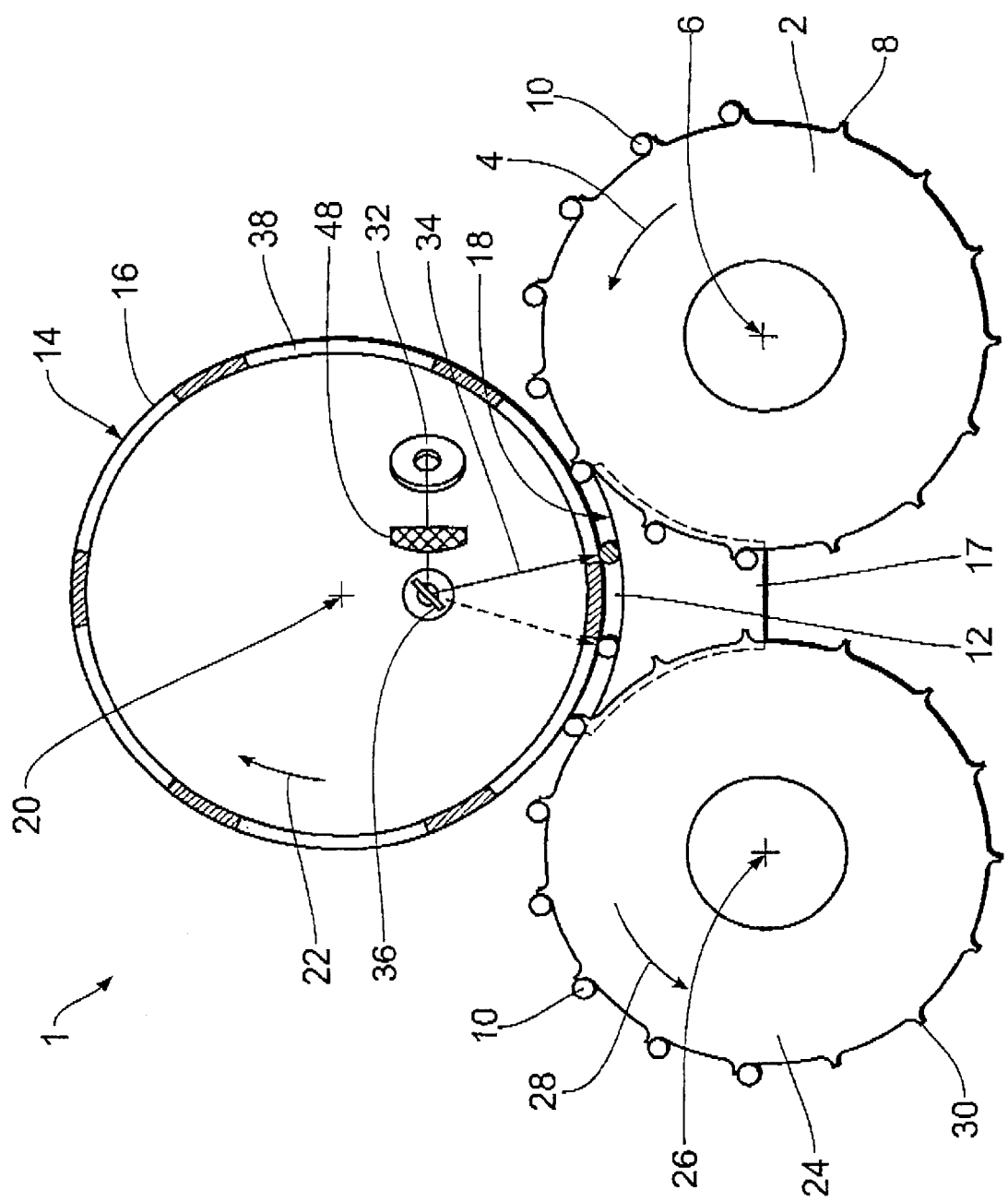
FIG. 3 is a view similar to that of FIG. 1 but showing a portion of a modified apparatus.

FIGS. 3 and 4 show certain relevant details of a second permeability enhancing apparatus 1'. All such parts of the apparatus 1' which are identical with or clearly analogous to the corresponding parts of the apparatus 1 of FIGS. 1 and 2 are denoted by similar reference characters. The only significant difference between the apparatus 1 and 1' is that, in the apparatus 1', the plano-convex lenses 40, 40' are replaced with similar lenses 48, 48' which are respectively located between the mirrors 32, 32' on the one hand, and the pivotable mirrors 36, 36' on the other hand. Thus, the lenses 48, 48' respectively focus the laser beams 34, 34' upon the pivotable mirrors 36, 36' before these mirrors direct the focussed beams 34, 34' upon selected portions of the envelope of a cigarette 10 rolling along the external surface 14 of the hollow conveyor 16 and over the respective slot- or slit-shaped openings 38.

It goes without saying that each of the apparatus 1 and 1' can operate only with one mirror (32 or 32'), with one mirror (36 or 36') and with one lens (such as 40 or 48).

An important advantage of the improved method and apparatus is that they are simpler and the apparatus 1, 1' are more compact than heretofore known permeability enhancing methods and apparatus. Thus, the various mirrors and lenses can be accommodated in a space (in the interior of the conveyor 16) which is available but not utilized in conventional perforating apparatus. Moreover, the paths for the beams of coherent high-energy radiation are shorter and can thus be controlled with a higher degree of accuracy. Still further, the various mirrors and lenses are simpler and less expensive than those which must be employed in conventional apparatus. For example, it is possible to dispense with complex and expensive mirrored drums.

The mirrors 36 and 36' are preferably mounted in such a way that their pivot axes intersect the respective radiation reflecting surfaces. FIGS. 1 and 3 show that the mirrors 36 are pivotable about axes which are parallel to the axis 20 of the hollow conveyor 16. However, it is equally possible and within the purview of the invention to mount the mirrors 36 (as well as the mirrors 36') in such a way that their pivot axes coincide with the axis 20, i.e., that the length of that portion of a beam 34 or 34' which propagates itself from the mirror 36 or 36' to the tubular envelope of a cigarette 10 in the rolling channel 12 matches or closely approximates the radius of the external surface 14. Also, such design ensures that the length of the beam portion between the mirror 36 or 36' and the envelope of a cigarette 10 in the rolling channel 12 remains unchanged during each and every stage of enhancement of permeability of such envelope.

An advantage of the embodiments which are actually shown in FIGS. 1 and 3, namely of the embodiments wherein the pivot axes for the mirrors 36 and 36' are nearer to the rolling channel 12 than the axis 20 of the hollow conveyor 16 (i.e., wherein the radius of the surface 14 is greater than the distance from the reflecting surface of the mirror 36 or 36' to the envelope of a cigarette 10 in the channel 12) is that the lens 40 or 40', or the lens 48 or 48', renders it possible to focus the beam (34 or 34') impinging upon the envelope of a cigarette 10 within the conveyor 16 with a degree of accuracy such that one can provide the envelope with perforations having diameters in the desirable range of 0.1 mm or thereabout. In contrast to the just described operation of the illustrated apparatus 1 and 1', conventional apparatus must employ complex optical elements which are called upon to reduce the diameters of laser beams from a diameter in the range of between about 5 and 11 mm to a diameter which is needed to make perforations with diameters (maximum dimensions) in the range of 0.1 mm.

In most or in many instances, the optical elements 40, 40' or 48, 48' constitute collector lenses or diffractive optical elements or combinations of collector lenses and diffractive optical elements. An advantage of the embodiment (apparatus 1) which is shown in FIGS. 1 and 2 is that relatively small lenses 40, 40' suffice to focus the respective beams 34, 34' upon the envelopes of cigarettes 10 in the channel 12. This renders it possible to readily accommodate the lenses 40, 40' in the interior of the conveyor 16.

It is also within the purview of the present invention to install the mirrors 36' and/or 36, 36' in the conveyor 16 in such a way that the radius of the surface 14 is smaller than the distance of mirror(s) 36 and/or 36, 36' from the locus (42) of impingement of a laser beam 34 or 34' upon the envelope of a cigarette 10 in the rolling channel. All that is necessary is to select appropriate mirrors and/or lenses which render it possible to adequately focus the laser beam or beams upon the surfaces of the cigarettes 10 in the channel 12 in order to make perforations having the desired diameters.

As already mentioned hereinbefore, it is desirable and advantageous to select the ratio of distances between the ribs 8 on the supplying conveyor 2 to the distance covered by any point on the envelope of a cigarette 10 in the channel 12 in such a way that the distance covered by such point exceeds the circumferential length of an envelope before a next-following cigarette enters that portion of the channel 12 wherein it begins to be acted upon by a beam 34' and/or 34. This enables the mirror 36' and/or 36 to reassume its starting angular position (in response to pivoting by the drive 46' and/or 46) in good time to proceed with the next perforating step. All that is necessary is to properly relate the speeds of the conveyors 2, 16 to each other and to the speed of pivoting the mirror 36' and/or 36 (by the drive 46' and/or 46) back to the starting position(s) of the mirror 36' and/or 36; this establishes an interval of time which follows the making of a circumferentially complete array or set of perforations and is long enough to enable the mirror 36' and/or 36 to thereupon reassume its starting position.

The above considerations apply independently of the distances between successive cigarettes 10 in the rolling channel 12. For example, if the angular spacing of ribs 8 on the conveyor 2 equals 12π, the spacing between successive cigarettes 10 in the channel 12 can also equal 12π or it can slightly exceed or be slightly smaller than 12π. This feature is believed to constitute a patentable innovation in combination with or independently of the feature of installing one or more radiation directing elements (such as L, 32, 32' 36, 36', 40, 40', 48, 48') in the interior of the rolling conveyor 16.

The just discussed feature of the invention can be resorted to irrespective of whether the lens or lenses (40, 40') is or are installed between the mirror(s) 36 or 36' and the channel 12 (see FIGS. 1 and 2) or between the mirror(s) 32 or 32' and the mirror or mirrors 36 or 36' (see FIGS. 3 and 4). All that is necessary is to properly select the characteristics of the lenses 40, 40', 48 and/or 48'.

In each of the aforediscussed embodiments, it is possible to provide the collector lenses with surface coatings to thus obtain so-called diffractive optics. For example, the coatings can be of a nature such that a laser beam having a circular cross-sectional area is converted into a beam having a polygonal cross-sectional area; this is advisable when the envelopes of the cigarettes 10 or analogous rod-shaped products are to be provided with non-circular perforations.

Still further, and as shown in FIGS. 2 and 4, the components 32 of the radiation directing means can constitute diffractive optics capable of splitting an incoming beam of high-energy radiation into a plurality of discrete beams. Diffractive optics are particularly desirable when it is necessary to enhance the focussing of a laser beam. Thus, even if the improved apparatus employs a relatively weak collector lens, and if the diameter of the round cross-sectional area of a laser beam is relatively large (e.g., in excess of 7 mm), the apparatus can make relatively small perforations with diameters below 0.1 mm.

Still further, each embodiment of the present invention is preferably (or can be) designed to achieve as pronounced depth of field of the optically imaged laser beam as possible. The reason is that this renders it possible to disregard those variations of distances between the pivotable mirror 36 and/or 36' and the locus or loci of impingement of the beam(s) upon a rolling envelope which are attributable to the fact that the pivot axis of the pivotable mirror does not coincide with the axis 20 of the hollow conveyor 16.

It is often preferred to install the laser L (or another suitable source of high-energy radiation) outside of the conveyor 16, i.e., to utilize this hollow or partially hollow conveyor as a housing for various components of the radiation directing means but not for the radiation source. An advantage of such apparatus is that the laser L or an equivalent or analogous source of high-energy radiation is readily or more readily accessible at all times.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art of perforating cigarette paper or the like and, therefore, such adaptations should and are intended to be comprehended within the meaning and range of equivalence of the appended claims.

What is claimed is:

1. Apparatus for increasing the permeabilities of tubular envelopes forming part of rod-shaped commodities and being perforatable in response to exposure to high-energy radiation, comprising:
    means for rolling a series of successive commodities sideways along a given path, including an at least partially hollow conveyor having an external surface bounding a portion of said path;
    a source of high-energy radiation; and
    means for directing at least some of the radiation issuing from said source through said at least partially hollow conveyor and against the envelopes of commodities rolling along said portion of said path for perforating said envelopes,
    wherein said means for directing includes at least one radiation reflecting element which is movable from a given starting position while directing radiation upon the envelope of a commodity along said portion of said path and back to said starting position.

2. The apparatus of claim 1, wherein said source includes at least one pulsating laser and the commodities include rod-shaped smokers' products.

3. The apparatus of claim 1, wherein said at least partially hollow conveyor includes a drum which is rotatable about a predetermined axis and said external surface is a cylindrical surface of said drum.

4. The apparatus of claim 3, wherein said rolling means further comprises a rolling member having a second surface bounding with said external surface a channel defining said portion of said path.

5. The apparatus of claim 4, wherein said rolling member is stationary.

6. The apparatus of claim 1, wherein at least a portion of said means for directing is located in said at least partially hollow conveyor.

7. The apparatus of claim 1, wherein said means for directing includes at least one mobile mirror.

8. The apparatus of claim 7, wherein said mirror is a pivotable mirror.

9. The apparatus of claim 1, further comprising means for supplying said series of commodities into said path while maintaining successive commodities of said series at given distances from each other, said rolling means including means for moving said external surface at a speed such that any point of the envelope of a commodity rolling along said portion of said path covers a distance greater than the circumferential length of a commodity while said supplying means advances each of said successive commodities through one of said given distances.

10. The apparatus of claim 9, wherein said speed of moving any point of an envelope of a commodity rolling along said portion of said path is such that the interval during which said point covers the part of said distance exceeding said circumferential length at least matches said given interval of time to thus permit said radiation reflecting element to reassume said starting position while a commodity is on its way into said portion of said path.

11. The apparatus of claim 1, wherein said at least one radiation reflecting element comprises a mirror having a radiation reflecting surface and means for pivoting said mirror about an axis which lies in said radiation reflecting surface.

12. The apparatus of claim 1, wherein said at least partially hollow conveyor is rotatable about a first axis and said radiation reflecting element comprises a mirror pivotable about a second axis at least substantially parallel to said first axis.

13. The apparatus of claim 1, wherein said at least partially hollow conveyor is rotatable about a given axis and said radiation reflecting element comprises a mirror pivotable about said given axis.

14. The apparatus of claim 13, wherein said external surface is a cylindrical surface having an axis coinciding with said given axis and said means for directing radiation is arranged to direct radiation upon the enveloped of a commodity in said portion of said path at a distance from said given axis less than the radius of said external surface.

15. The apparatus of claim 1, wherein said means for directing radiation comprises at least one light refracting element.

16. The apparatus of claim 15, wherein said at least one radiation reflecting device comprises a pivotable mirror and said at least one light refracting element is disposed between said source and said pivotable mirror.

17. The apparatus of claim 15, wherein said at least one radiation reflecting device comprises a pivotable mirror and said at least one light refracting element is disposed between said pivotable mirror and the locus of impingement of radiation upon the envelope of a commodity in said portion of said path.

18. The apparatus of claim 1, wherein said means for directing radiation comprises at least one of (a) a collector lens, (b) a diffractive optical element, and (c) a combination of a collector lens and a diffractive optical element.

19. The apparatus of claim 1, wherein said at least partially hollow conveyor includes a drum which is rotatable about a predetermined axis and said external surface is a cylindrical surface of said drum, said source being located outside of said at least partially hollow conveyor and being arranged to direct at least some of the high-energy radiation into said drum along a second path which is at least substantially parallel to said predetermined axis, said at least one radiation reflecting element comprising a pivotable mirror arranged to direct radiation upon the envelope of a commodity rolling along said portion of said predetermined path and means for deflecting radiation issuing from said source and for directing deflected radiation upon said pivotable mirror.

20. The apparatus of claim 1, wherein said at least partially hollow conveyor has at least one opening provided in said external surface and being partially overlapped by a commodity rolling along said portion of said path, said means for directing radiation being arranged to direct radiation upon a commodity in said portion of said path from the interior of said at least partially hollow conveyor and through said at least one opening.

21. The apparatus of claim 20, wherein said external surface is a cylindrical surface and said at least one opening includes an arcuate slot extending at least substantially circumferentially of said cylindrical surface.

22. The apparatus of claim 20, wherein said path includes an arcuate channel having a center of curvature at least close to an axis of said cylindrical surface.

23. The apparatus of claim 20, wherein said at least partially hollow conveyor has a plurality of arcuate openings and said means for directing radiation includes means for splitting a beam of radiation issuing from said source into a plurality of discrete beams and means for directing each of said discrete beams through a different one of said openings.

24. The apparatus of claim 1, wherein the at least one radiation reflecting element follows the commodity along the portion of the path.

25. Apparatus for increasing the permeabilities of tubular envelopes forming part of rod-shaped commodities and being perforatable in response to exposure to high-energy radiation, comprising:
    means for rolling a series of successive commodities sideways along a given path;
    means for supplying said series of commodities into said path while maintaining successive commodities of said series at given distances from each other;
    a source of high-energy radiation; and
    means for directing at least some of the radiation issuing from said source against the envelopes of commodities rolling along said path for perforating said envelopes, wherein said means for directing includes at least one radiation reflecting element which is movable from a given starting position while directing radiation upon the envelope of a commodity along said path and back to said starting position.

26. The apparatus of claim 25, wherein said angular speed is such that the interval during which said point covers the part of said distance exceeding said circumferential length at least matches said predetermined interval of time to thus permit said at least one radiation reflecting element to reassume said starting position while commodity is on its way into said predetermined portion of said path.

27. The apparatus of claim 26, wherein said rolling means and said supplying means form part of a machine for making filter cigarettes.

28. The apparatus of claim 26, wherein said rolling means defines an elongated channel, at least a portion of said path extending through said channel.

* * * * *